United States Patent
Kong et al.

(10) Patent No.: US 8,964,421 B2
(45) Date of Patent: Feb. 24, 2015

(54) POWERING A SYNCHRONOUS RECTIFIER CONTROLLER

(71) Applicant: iWatt Inc., Campbell, CA (US)

(72) Inventors: Pengju Kong, Santa Clara, CA (US); Jianming Yao, San Jose, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 147 days.

(21) Appl. No.: 13/804,783

(22) Filed: Mar. 14, 2013

(65) Prior Publication Data
US 2014/0268915 A1 Sep. 18, 2014

(51) Int. Cl.
H02M 3/335 (2006.01)

(52) U.S. Cl.
CPC .................... *H02M 3/33592* (2013.01)
USPC ....................... 363/21.14; 363/21.06

(58) Field of Classification Search
USPC ................... 364/21.06, 21.12, 21.14
See application file for complete search history.

(56) References Cited

U.S. PATENT DOCUMENTS

| | | | |
|---|---|---|---|
| 6,813,166 B1 * | 11/2004 | Chang et al. | 363/21.14 |
| 7,262,977 B2 * | 8/2007 | Kyono | 363/21.06 |
| 7,869,231 B2 * | 1/2011 | Cohen | 363/21.14 |
| 7,876,583 B2 * | 1/2011 | Polivka et al. | 363/21.14 |
| 8,310,847 B2 * | 11/2012 | Hsu | 363/21.14 |
| 8,520,414 B2 * | 8/2013 | Garrity et al. | 363/21.14 |
| 8,570,772 B2 * | 10/2013 | Morris et al. | 363/21.14 |
| 8,730,688 B2 * | 5/2014 | Hsu | 363/21.14 |

OTHER PUBLICATIONS

Monolithic Power Systems, Inc., "MP6902: Fast Turn-off Intelligent Controller," Jan. 11, 2013, twelve pages.

* cited by examiner

*Primary Examiner* — Emily P Pham
(74) *Attorney, Agent, or Firm* — Fenwick & West LLP (57) ABSTRACT

The embodiments herein describe a switched mode power converter. In particular, the embodiments herein disclose a method for powering a synchronous rectifier controller that enables synchronous rectification in the switched mode power converter. The synchronous rectifier controller may be enabled by a regulator circuit or directly from the output voltage.

18 Claims, 10 Drawing Sheets

POWERING A SYNCHRONOUS RECTIFIER CONTROLLER

BACKGROUND

1. Field of Technology

Embodiments disclosed herein relate generally to switching power converters, and more specifically, to techniques for powering a synchronous rectifier controller of a switching power converter.

2. Description of the Related Arts

Figure 1:
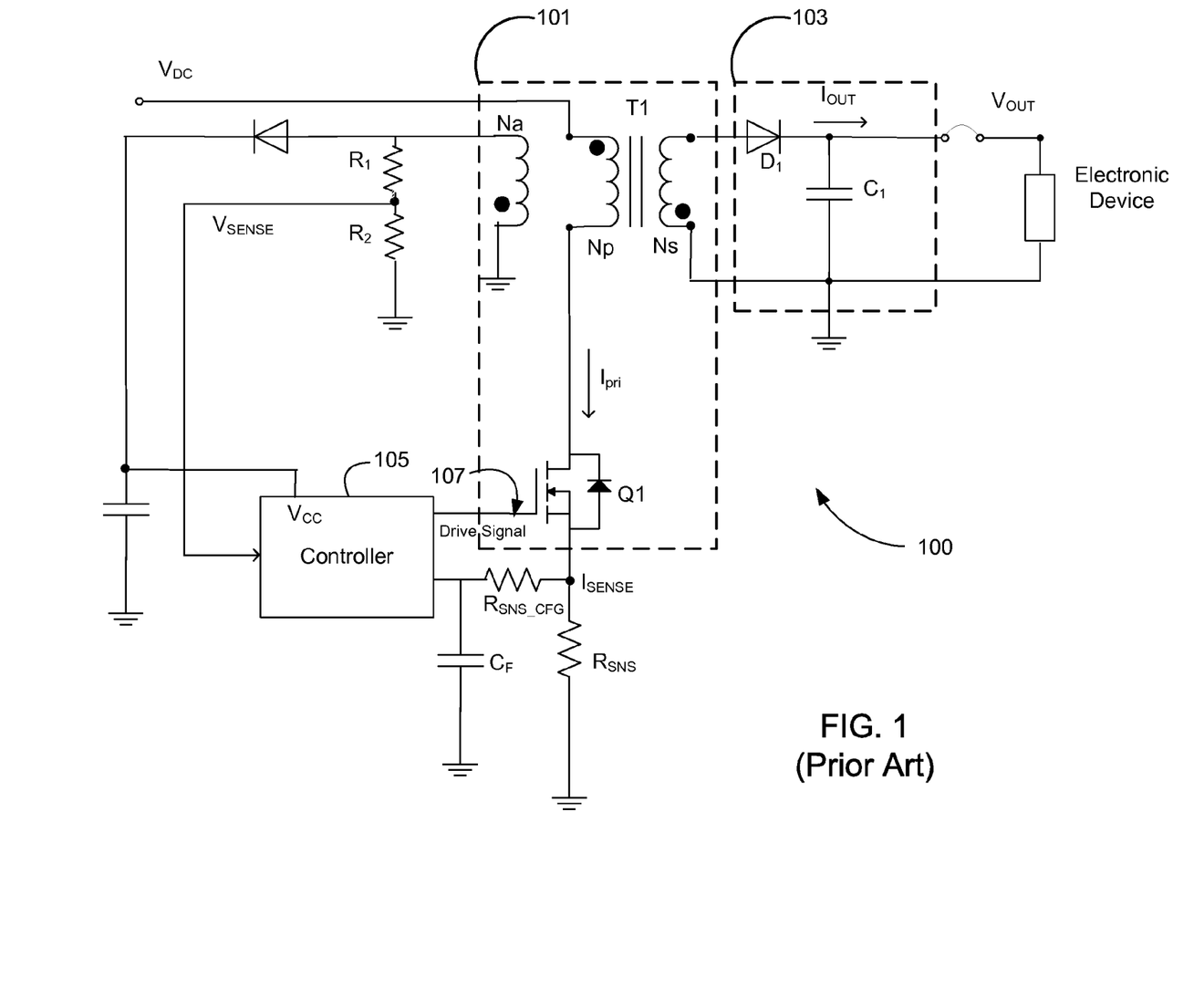
FIG. 1 is a circuit diagram of a conventional switching power converter.

FIG. 1 is a circuit diagram of a conventional flyback type switching power converter 100 that uses a switch Q1 such as a metal-oxide-semiconductor field-effect transistor (MOSFET). The switching power converter 100 includes a power stage 101 and a secondary output stage 103. Power stage 101 includes the switch Q1 and a power transformer T1. Power transformer T1 includes primary winding Np, secondary winding Ns, and auxiliary winding Na. Secondary output stage 103 includes diode $D_1$ and output capacitor $C_1$. A controller 105 controls the ON state and the OFF state of switch Q1 using output drive signal 107 in the form of a pulse with on-times ($T_{ON}$) and off-times ($T_{OFF}$).

AC power is received from an AC power source (not shown) and is rectified to provide the unregulated input voltage $V_{DC}$. The input power is stored in transformer T1 while the switch Q1 is turned on, because the diode $D_1$ becomes reverse biased when the switch Q1 is turned on. The rectified input power is then transferred to an electronic device across the capacitor $C_1$ while the switch Q1 is turned off, because the diode $D_1$ becomes forward biased when the switch Q1 is turned off. Diode $D_1$ functions as an output rectifier and capacitor $C_1$ functions as an output filter. The resulting regulated output voltage $V_{OUT}$ is delivered to the electronic device.

In high output current applications, the conduction loss of the diode D1 operating as the output rectifier is significant. A MOSFET or other actively-controlled switch may replace the diode D1 to minimize conduction loss in the power converter 100 during high output current applications. The MOSFET functions as a synchronous rectifier in the power converter 100. To achieve proper operation of the synchronous rectifier, a synchronous rectifier controller is added to the power converter 100 to control the operation of the synchronous rectifier.

Conventional synchronous rectifier controllers may be powered by the output voltage $V_{OUT}$ of the power converter 100. However, many applications have output voltages lower than the bias voltage required for powering conventional synchronous rectifier controllers. For example, an alternating current (AC)-direct current (DC) charger for mobile devices requires the charger to switch operation between a constant voltage mode where a constant voltage is provided to the mobile devices and a constant current mode where a constant current is provided to the mobile devices depending on the requirements of the mobile devices.

During the constant current mode of the AC-DC charger, the output voltage may drop below the voltage required to power the synchronous rectifier controller. As a result, the synchronous rectifier controller is disabled since the output voltage is insufficient to power the synchronous rectifier controller. When the synchronous rectifier controller is disabled, the body diode of the synchronous rectifier begins to conduct resulting in higher conduction losses and thermal issues. Thus, synchronous rectification is unavailable across the entire operating range of the constant current mode in conventional switched mode power supplies.

SUMMARY

The embodiments herein disclose a method for powering a synchronous rectifier controller included in a switched mode power supply of an AC-DC charger that enables synchronous rectification across the entire operating range of the constant current mode and constant voltage mode. In one embodiment, the switched mode power supply includes a regulator circuit that generates a bias voltage that enables the synchronous rectifier controller to control a synchronous rectifier.

The regulator circuit may enable the synchronous rectifier controller to control the operation of the synchronous rectifier if the output voltage of the switched mode power supply is less than the bias voltage required to enable the synchronous rectifier controller. In another embodiment, the regulator circuit is disabled from enabling the synchronous rectifier if the output voltage is greater than the bias voltage. When the regulator circuit is disabled, the synchronous rectifier controller may be powered directly from the output voltage of the switched mode power supply.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

Figure 2:
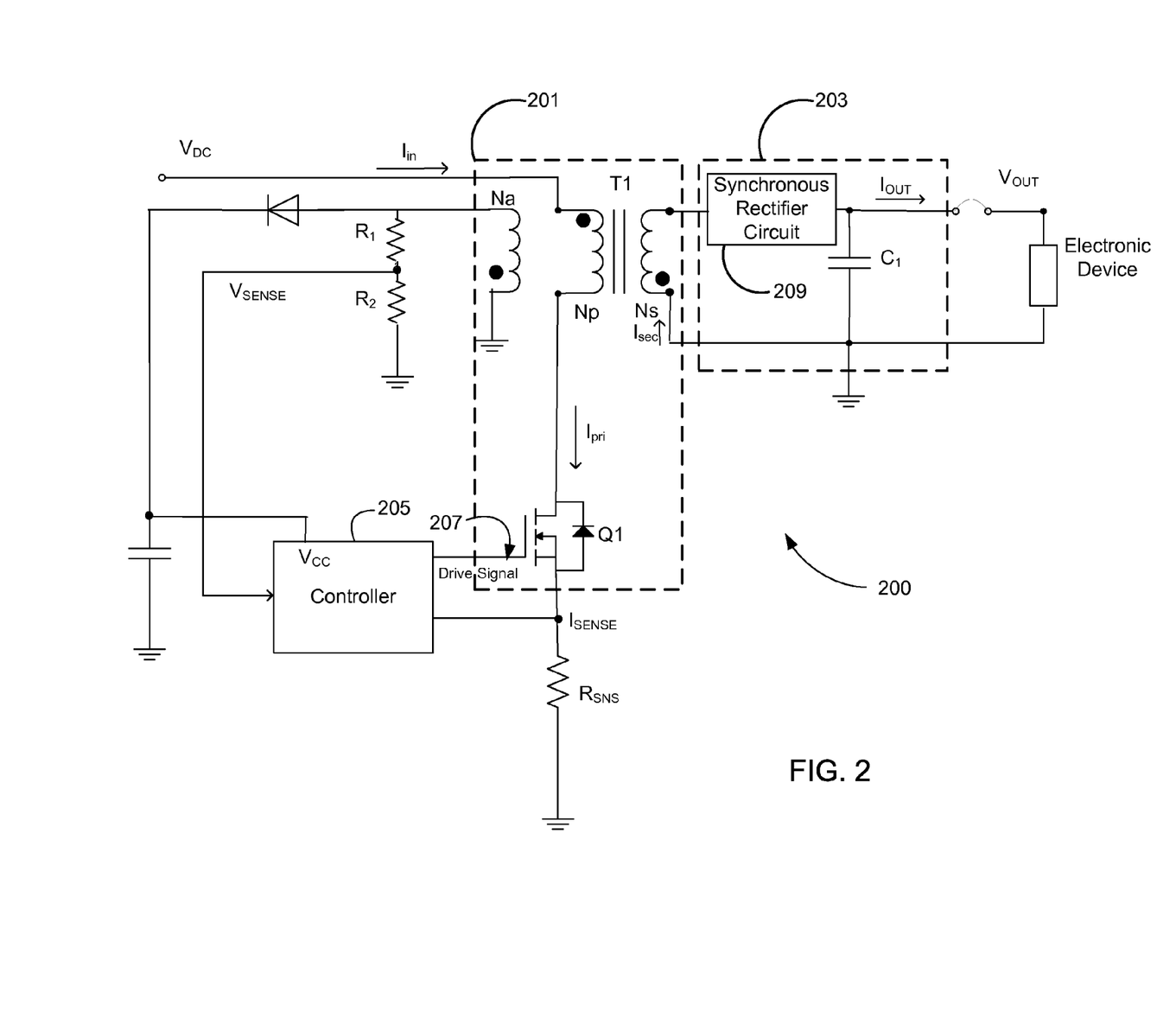
FIG. 2 is a circuit diagram of a switching power converter including a synchronous rectifier circuit according to one embodiment.

FIG. 2 is a circuit diagram of a flyback type switching power converter 200. The power converter 200 may be incorporated in an AC-DC charger that charges an electronic device coupled to the AC-DC charger. The AC-DC charger is configured to switch operation between a constant voltage (CV) mode where a constant voltage is supplied to the electronic device and a constant current (CC) mode where a constant current is supplied to the electronic device. The AC-DC charger switches operation between the CV mode and the CC mode depending on the requirements of the electronic device coupled to the AC-DC charger. As will be further described below, the power converter 200 includes a synchronous rectifier circuit 209 that operates across the entire operating range of the CC mode and the CV mode thereby increasing efficiency of the power converter 200 compared to conventional power converters.

As shown in FIG. 2, the power converter 200 includes a switch Q1. In one embodiment, the switch Q1 is a MOSFET. However, the switch Q1 may be any type of switching device such as a bipolar junction transistor (BJT). The switching power converter 200 includes a power stage 201 and a secondary output stage 203. Power stage 201 includes the switch Q1 and a power transformer T1. Power transformer T1 includes primary winding Np, secondary winding Ns, and auxiliary winding Na. Secondary output stage 203 includes a synchronous rectifier circuit 209 and output capacitor $C_1$. As shown in FIG. 2, the synchronous rectifier circuit 209 is coupled between an upper side of the secondary winding Ns of the transformer T1 and the output capacitor $C_1$. A controller 205 controls the ON state and the OFF state of switch Q1 using output drive signal 207 in the form of a pulse with on-times ($T_{ON}$) and off-times ($T_{OFF}$). That is, the controller 205 generates the output drive signal 207 that drives the switch Q1.

AC power is received from an AC power source (not shown) and is rectified to provide the unregulated input voltage $V_{DC}$. The input power is stored in transformer T1 while the switch Q1 is turned on. When the switch Q1 is on, the synchronous rectifier circuit 209 is disabled (i.e., off) thereby blocking a pathway to transfer the stored input power to the electronic device. The rectified input power is then transferred to an electronic device across the capacitor $C_1$ when the switch Q1 is turned off and when the synchronous rectifier circuit 209 is turned on. When the synchronous rectifier 209 is enabled (i.e., turned on), the pathway to deliver the stored input power to the electronic device is created. Generally, the synchronous rectifier circuit 209 functions as an output rectifier and capacitor $C_1$ functions as an output filter. The resulting regulated output voltage $V_{OUT}$ is delivered to the electronic device.

As mentioned previously, the controller 205 generates appropriate switch drive pulses 207 to control the on-times and off-times of switch Q1 and regulate the output voltage $V_{OUT}$. The controller 205 controls switch Q1 using a feedback loop based on the sensed output voltage $V_{SENSE}$ and the sensed primary side current $I_{pri}$ in previous switching cycles of the switching power converter 200 to generate the timings to turn on or off the switch Q1 in subsequent switching cycles, in a variety of operation modes including PWM (pulse width modulation) and/or PFM (pulse frequency modulation) modes. Additionally, the controller 205 may control the power converter 200 to switch operation between the CV mode and the CC mode depending on the requirements of the electronic device coupled to the power converter 200. $I_{SENSE}$ is the voltage across resistor $R_{SNS}$ and is used by the controller 205 to sense the primary current $I_{pri}$ through the primary winding Np and switch Q1 in the form of a voltage across the sense resistor $R_{SNS}$ and ground.

The output voltage $V_{OUT}$ is reflected across auxiliary winding Na of transformer T1, which is input to controller 205 as the voltage $V_{SENSE}$ via a resistive voltage divider comprised of resistors $R_1$ and $R_2$. Based on the sensed output voltage, the controller 205 determines the times at which the switch Q1 is turned on in PFM, PWM, or any other regulation mode employed by the controller 205.

Figure 3:
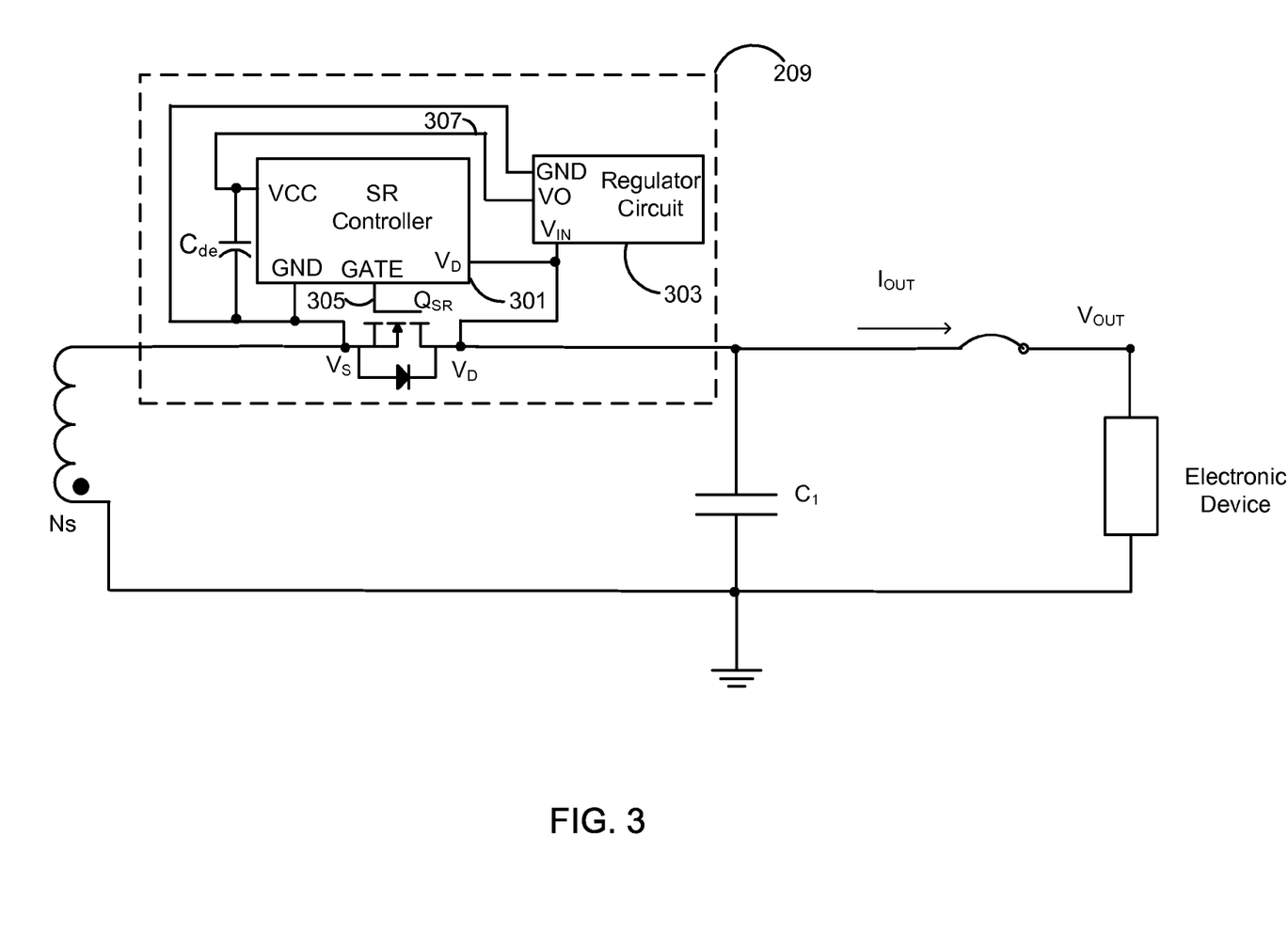
FIG. 3 is a circuit diagram illustrating the synchronous rectifier circuit of FIG. 2 in more detail according to one embodiment.

FIG. 3 is a circuit diagram of the synchronous rectifier circuit 209 according to one embodiment. The synchronous rectifier circuit 209 includes a synchronous rectifier switch $Q_{SR}$. In one embodiment, the synchronous rectifier switch $Q_{SR}$ is a MOSFET that replaces the diode D1 in the conventional power converter 100. However, any type switching device such as a BJT may be used in different embodiments. The synchronous rectifier switch $Q_{SR}$ couples the upper side of the secondary winding Ns of the transformer T1 to the output of the converter 200 and operates as a pathway to transfer power stored in the transformer T1 to the electronic device when the synchronous rectifier switch $Q_{SR}$ is on. As shown in FIG. 3, the source terminal of the synchronous rectifier switch $Q_{SR}$ is coupled to the upper side of the secondary winding Ns of the power transformer T1 and the drain terminal of the synchronous rectifier switch $Q_{SR}$ is coupled to the output of the power converter 200. The gate terminal of the synchronous rectifier switch $Q_{SR}$ is coupled to a synchronous rectifier (SR) controller 301 included in the synchronous rectifier circuit 209 as will be further described below.

The SR controller 301 controls the ON state and OFF state of the synchronous rectifier switch $Q_{SR}$ using output drive signal 305 in the form of a pulse with on-times and off times during each switching cycle of the synchronous rectifier switch $Q_{SR}$. Particularly, the SR controller 301 generates the output drive signal 305 to turn off the synchronous rectifier switch $Q_{SR}$ during each switching cycle when the switch Q1 is on. When synchronous rectifier switch $Q_{SR}$ is off and switch Q1 is on during each switching cycle, the input power is stored in the transformer T1 because a pathway is unavailable to transfer the power to the electronic device. In one embodiment, the SR controller 301 determines when to turn off synchronous rectifier switch $Q_{SR}$ based on the drain-to-source voltage of the synchronous rectifier switch $Q_{SR}$ sensed at pin $V_D$ of the SR controller 301 as will be further described below with respect to FIG. 6.

Conversely, the SR controller 301 generates the output drive signal 305 to turn on synchronous rectifier switch $Q_{SR}$ when switch Q1 is turned off during each switching cycle. When synchronous rectifier switch $Q_{SR}$ is turned on and switch Q1 is turned off, a path is created to transfer the input power stored in the transformer T1 to the electronic device when the synchronous rectifier switch $Q_{SR}$ conducts. In one embodiment, the SR controller 301 determines when to turn on synchronous rectifier switch $Q_{SR}$ based on the drain-tosource-voltage of synchronous rectifier $Q_{SR}$ sensed at pin $V_D$ of the SR controller 301 as will be further described below with respect to FIG. 6.

As shown in FIG. 3, the power supply pin VCC of the SR controller 301 is coupled to the output pin VO of a regulator circuit 303 included in the synchronous rectifier circuit 209. The output pin GATE of the SR controller 301 is coupled to the gate terminal of synchronous rectifier $Q_{SR}$. The ground pin GND of the SR controller 301 is coupled to the ground pin GND of the regulator circuit 303. A capacitor $C_{de}$ is coupled between the GND pin and the VCC pin of the SR controller 30. The capacitor $C_{de}$ filters the bias voltage 307 provided by the regulator circuit 303 to the VCC pin of the SR controller 301 to power the SR controller 301 as will be further described below. The input voltage pin $V_D$ of the SR controller 301 is coupled to the input voltage pin $V_{IN}$ of the regulator circuit 303 and the drain terminal of synchronous rectifier switch $Q_{SR}$.

Note that in the embodiment shown in FIG. 3, the GND pin of the SR controller 301 is coupled to the source terminal of the synchronous rectifier $Q_{SR}$. Thus, the ground reference for the SR controller 301 is floating. Because the SR controller 301 has a floating ground reference, the output voltage $V_{OUT}$ cannot be used to power the SR controller 301 because it is difficult to determine if the output voltage $V_{OUT}$ is sufficiently high to power the SR controller in a manner that allows for proper operation of the synchronous rectifier switch $Q_{SR}$.

In one embodiment, the regulator circuit 303 generates the bias voltage 307 used to power the SR controller 301 during each switching cycle of the power converter 200. For most MOSFETs available in the market, the bias voltage 307 is at least 4V in order to allow the SR controller 301 to generate a control signal 305 (e.g., a gate voltage) to turn on the synchronous rectifier switch $Q_{SR}$ efficiently during each switching cycle. By generating the bias voltage 307 to power the SR controller 301, the SR controller 301 can operate the synchronous rectifier switch $Q_{SR}$ throughout the entire operation range of the CC mode and CV mode of the power converter 200.

As shown in FIG. 3, the regulator circuit 303 is external to the SR controller 301. The input voltage pin $V_{IN}$ of the regulator circuit 303 is coupled to the drain terminal of the synchronous rectifier switch $Q_{SR}$. Thus, the regulator circuit 303 receives the drain voltage of synchronous rectifier switch $Q_{SR}$ as its supply voltage. The output pin VO of the regulator circuit 303 is coupled to the VCC pin of the SR controller 301. The GND pin of the regulator circuit 303 is coupled to the GND pin of the SR controller 301.

Figure 4:
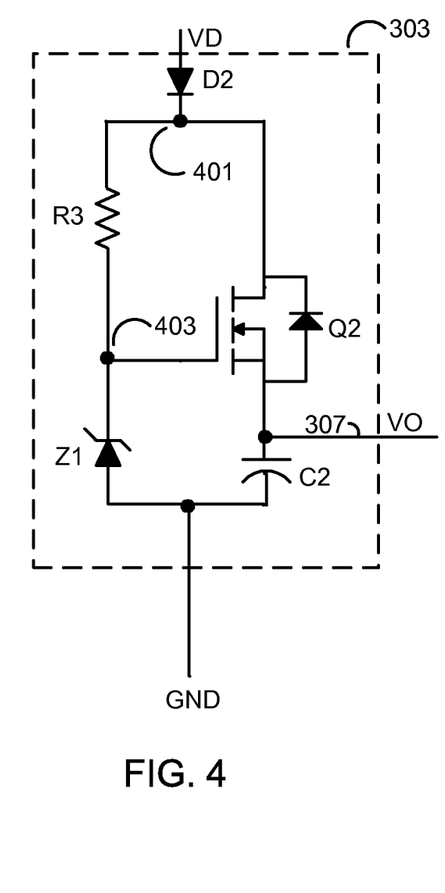
FIG. 4 is a circuit diagram of a regulator circuit according to one embodiment.

FIG. 4 illustrates a circuit diagram of the regulator circuit 303 according to one embodiment. In particular, a linear regulator circuit is used to generate the bias voltage 307 used to power the SR controller 301. In another embodiment, a charge pump circuit may be used as the regulator circuit 303 instead of the linear regulator circuit.

As shown in FIG. 4, the regulator circuit 303 includes a diode D2. The anode of diode D2 is coupled to the drain terminal of the switch $Q_{SR}$. The cathode of the diode D2 is coupled to a resistor R3 and the drain of switch Q2 at node 401. The regulator circuit 303 also includes a Zener diode Z1. The anode of the Zener diode Z1 is coupled to ground GND (the source terminal of the synchronous rectifier $Q_{SR}$) and the negative end of the capacitor C2. The cathode of the Zener diode Z1 is coupled to both the resistor R3 and the gate terminal of switch Q2 at node 403. The positive end of the capacitor C2 is coupled to the source terminal of switch Q2 at the VO pin of the regulator 303.

When switch Q1 is on and the synchronous rectifier $Q_{SR}$ is disabled, the drain voltage of synchronous rectifier $Q_{SR}$ is high. Diode D2 rectifies the drain voltage and current flows through resistor R3. The Zener diode Z1 clamps a voltage (e.g., 1.5V) at node 403 which is tied to the gate terminal of switch Q2 thereby turning on switch Q2. The current generated through switch Q2 is stored as energy in the capacitor C2.

When switch Q2 is turned off, the energy stored in the capacitor C2 is released thereby generating the bias voltage 307 used to power the SR controller 301. The switch Q2 is turned off when the bias voltage 307 is greater than the difference of the breakdown voltage of the Zener diode Z1 and the gate threshold voltage of the switch Q2. The switch Q2 may also be turned off when the drain voltage of switch $Q_{SR}$ is less than the breakdown voltage of the Zener diode Z1 which may occur during the duration when switch Q1 is off.

Figure 5:
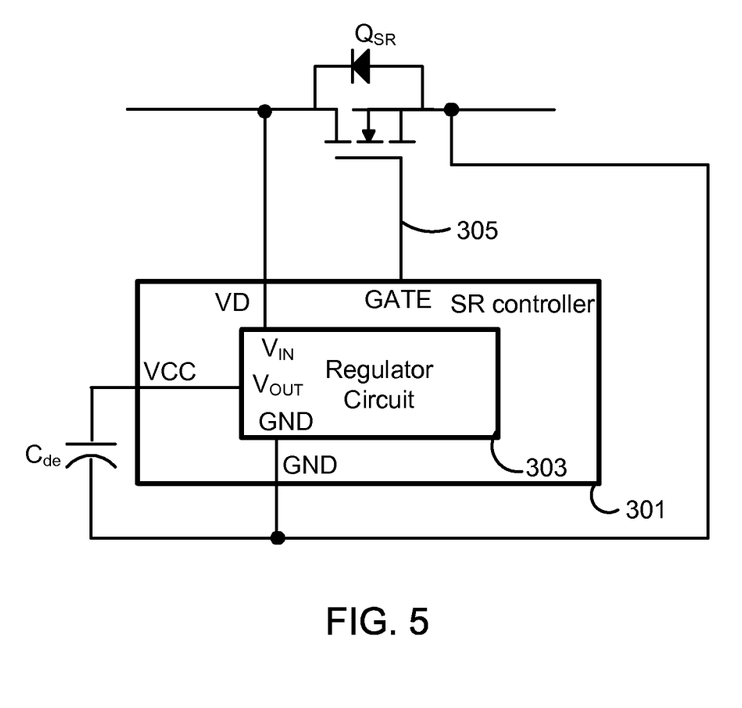
FIG. 5 is a circuit diagram of a synchronous rectifier controller integrating the regulator circuit according to one embodiment.

FIG. 5 illustrates an alternative embodiment of the SR controller 301. In FIG. 5, the regulator circuit 303 is integrated in the SR controller 301 rather than implemented as a separate component as described with respected to FIG. 3. The regulator circuit 303 and the SR controller 301 shown in FIG. 6 perform similar functions as described with respect to FIG. 3 and thus the description is omitted.

Figure 6:
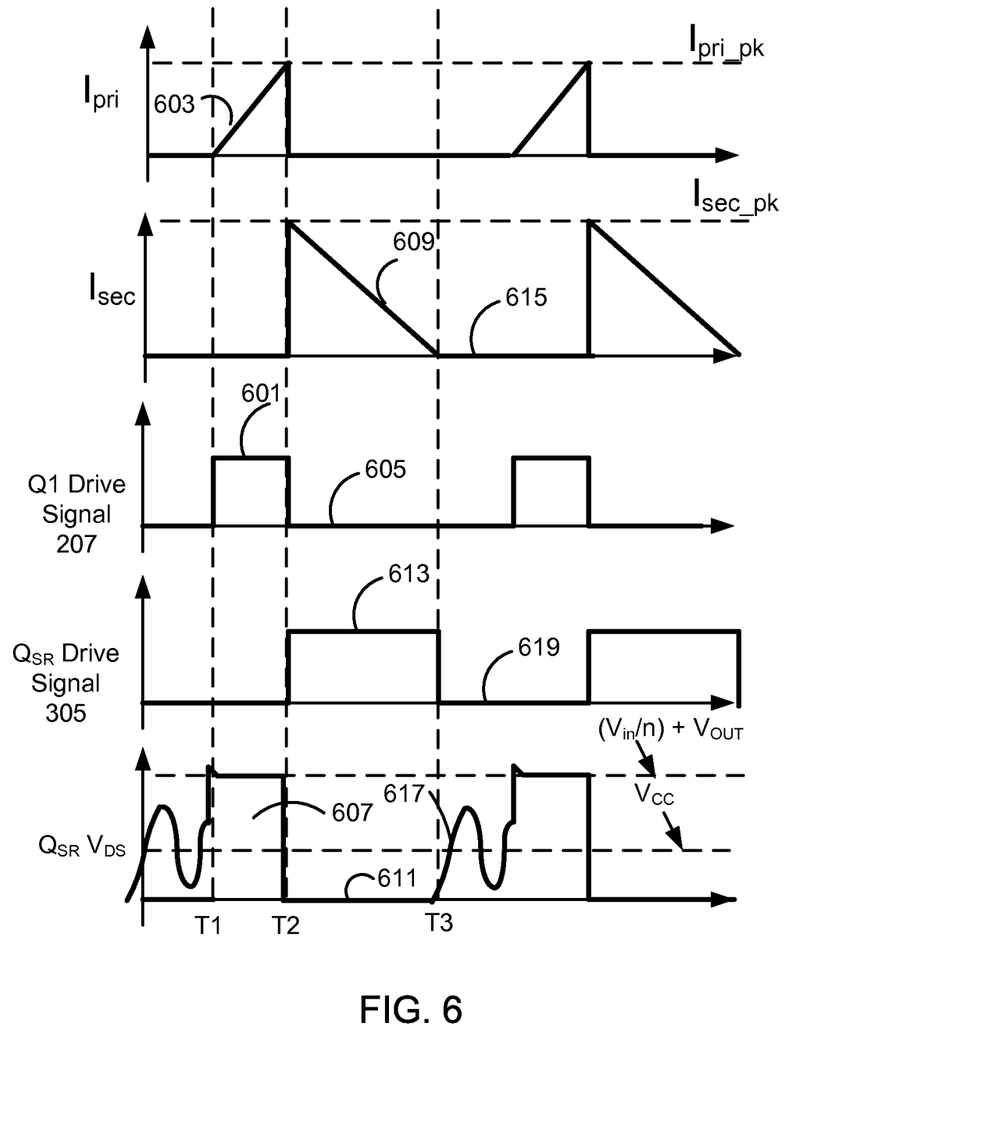
FIG. 6 illustrates waveform diagrams of the switching power converter.

FIG. 6 illustrates waveforms of the power converter 200 describing operation of the synchronous rectifier circuit 209 during a switching cycle of the power converter 200. The waveforms include a primary side current ($I_{pri}$) waveform, a secondary side current ($I_{sec}$) waveform, a drive signal 207 waveform for switch Q1, a drive signal 305 waveform for synchronous rectifier switch $Q_{SR}$, and drain-to-source voltage ($V_{DS}$) waveform of synchronous rectifier switch $Q_{SR}$. At time T1, the drive signal 207 generated by controller 205 is high 601 thereby turning switch Q1 on. When switch Q1 is on, the primary side current Ipri rises 603 until a peak primary side current Ipri_pk is reached at time T2. At time T1, synchronous rectifier switch $Q_{SR}$ is off as indicated by the low 605 drive signal 305.

At time T2, the drive signal 207 transitions low 605 thereby turning off switch Q1. Between time T1 and time T2, the drain-to-source voltage ($V_{DS}$) of the synchronous rectifier switch $Q_{SR}$ is at a voltage level corresponding to the sum of the voltage at the secondary winding Ns of the transformer T1 and the output voltage $V_{OUT}$ (i.e., ($V_{in}/n$)+$V_{OUT}$, where "n" is the number of windings in the transformer T1). The area 607 of the drain-to-source voltage ($V_{DS}$) waveform between the voltage $V_{cc}$ required to operate the SR controller 301 and the voltage level corresponding to the sum of the voltage at the secondary winding of the transformer T1 and the output voltage $V_{OUT}$ represents the drain voltage input to the regulator circuit 303 to generate the bias voltage 307.

When the switch Q1 is turned off at time T2, the secondary current Isec instantaneously reaches a peak secondary current Isec_pk and begins to decline 609 as the stored input power in the transformer T1 is transferred to the electronic device. Furthermore, at time T2, the drain-to-source voltage ($V_{DS}$) of synchronous rectifier switch $Q_{SR}$ falls to approximately zero volts 611. At time T2, the SR controller 301 detects that that the voltage $V_{DS}$ of synchronous rectifier $Q_{SR}$ is approximately zero volts 611 and in response applies a high 613 drive signal 305 to the gate terminal of synchronous rectifier switch $Q_{SR}$ to turn on synchronous rectifier $Q_{SR}$. During the on-time of the synchronous rectifier switch $Q_{SR}$ between time T2 and time T3, the secondary side current $I_{SEC}$ causes a $V_{DS}$ voltage (in the range of several mili-volts) of the synchronous rectifier switch $Q_{SR}$ because of the on-resistance of the synchronous rectifier switch $Q_{SR}$. Thus, the voltage $V_{DS}$ approaches zero when the secondary side current $I_{SEC}$ reaches approximately zero amps. At time T3, the secondary side current (Isec) reaches approximately zero amps 615. The SR controller 301 detects that the voltage $V_{DS}$ of the synchronous rectifier switch $Q_{SR}$ is approximately zero volts 611 and in response applies a low 619 drive signal 305 to the gate terminal of the synchronous rectifier switch $Q_{SR}$ to turn off the synchronous rectifier switch $Q_{SR}$. After T3, voltage $V_{DS}$ begins to ring 617 caused by the parasitic capacitance of power state 201 and the inductance of the transformer T1.

Figure 7:
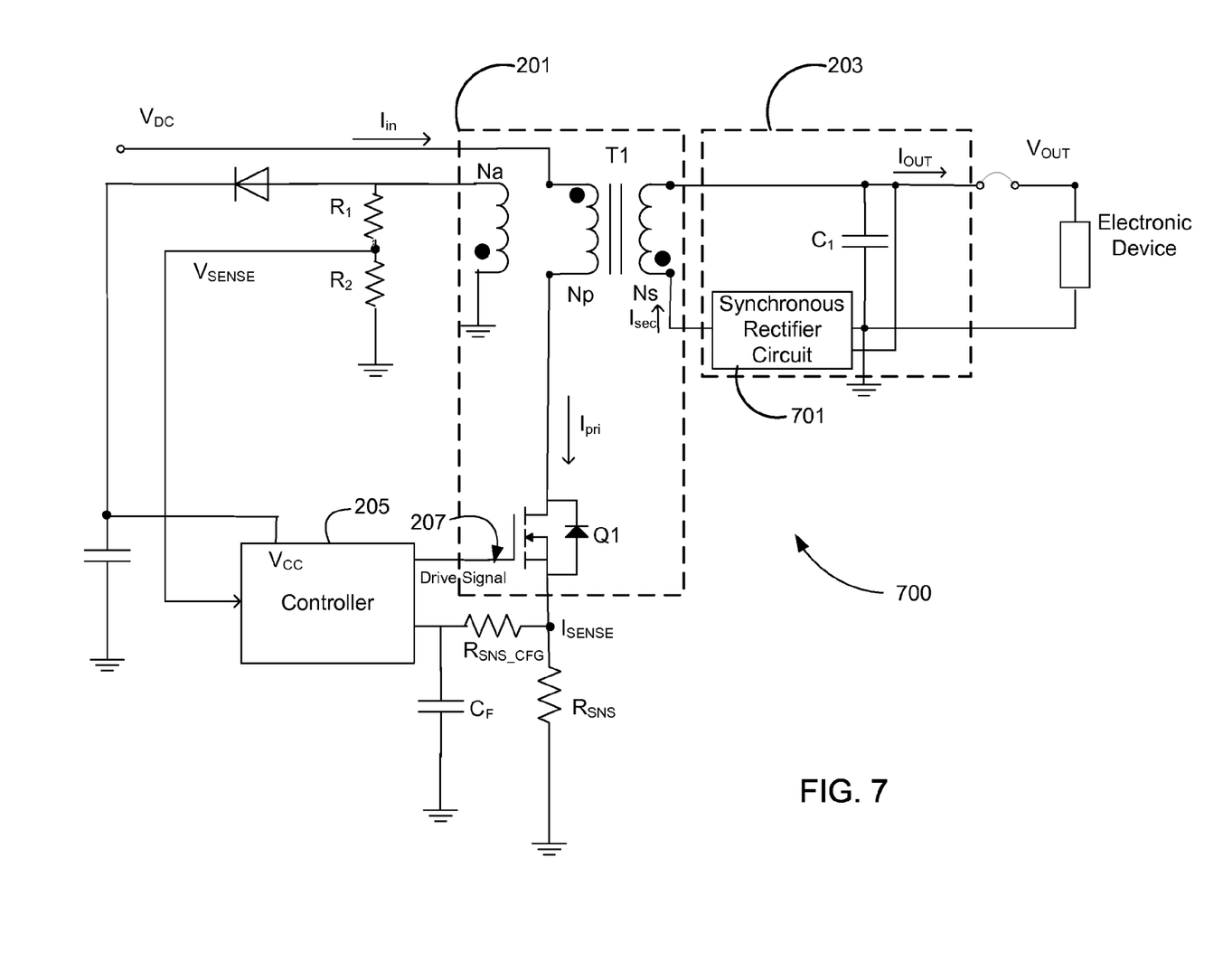
FIG. 7 is a circuit diagram of a switching power converter including a synchronous rectifier circuit according to another embodiment.

FIG. 7 is a circuit diagram of a flyback switching power converter 700 according to one embodiment. The power converter 700 includes similar components as the embodiment shown in FIG. 2. Thus, the description of similar elements of power converter 700 is omitted. However, in the power converter 700 shown in FIG. 7, note that the synchronous rectifier circuit 701 is coupled to the lower side of the secondary winding Ns of the transformer T1 in contrast to the synchronous rectifier 209 shown in FIG. 2 that is coupled to the upper side of the secondary winding Ns of the transformer T1.

Figure 8:
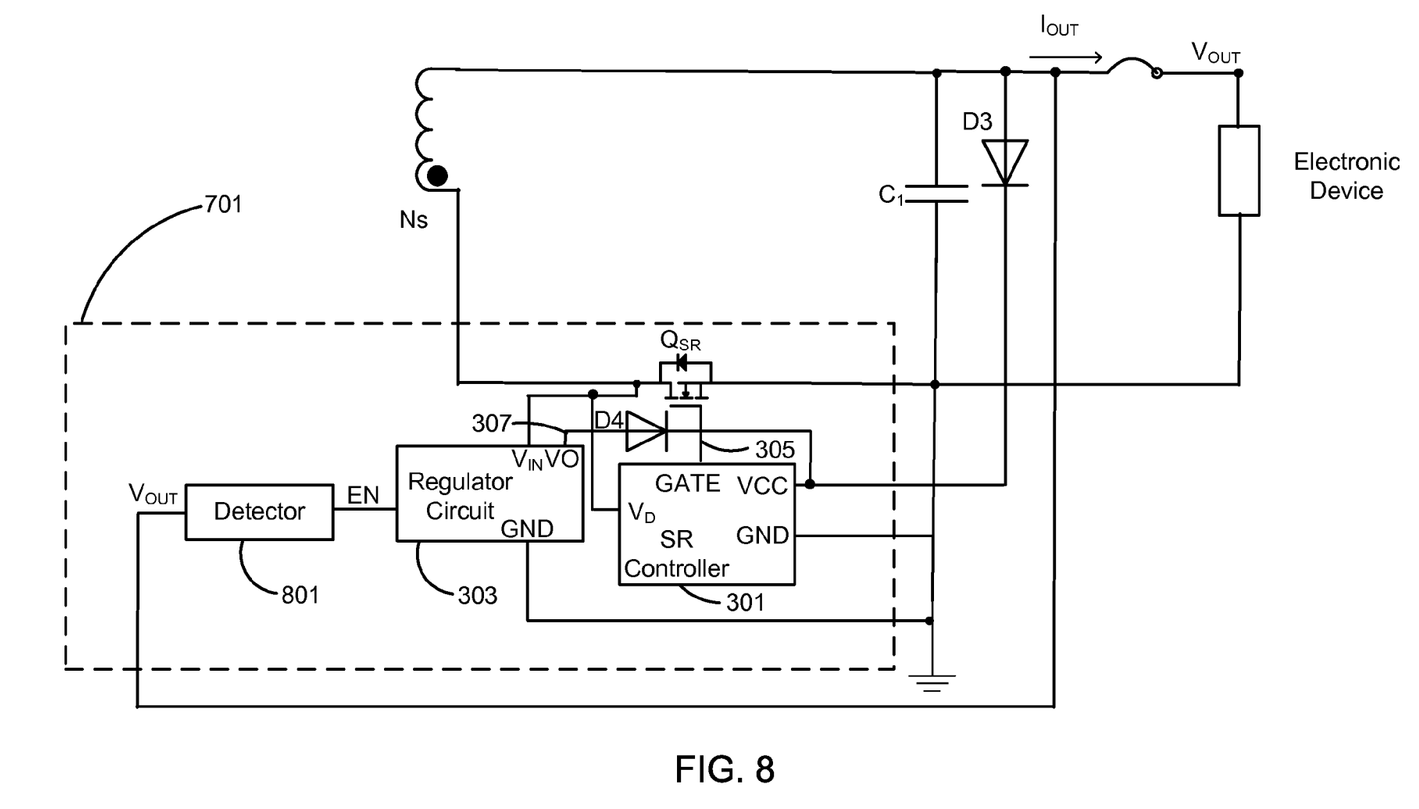
FIG. 8 is a circuit diagram of the synchronous rectifier circuit of FIG. 7 according to another embodiment.

FIG. 8 is a circuit diagram of the synchronous rectifier circuit 701 according to one embodiment. The synchronous rectifier circuit 701 includes synchronous rectifier switch $Q_{SR}$. The drain of the synchronous rectifier switch $Q_{SR}$ is coupled to the lower side of the secondary winding Ns of the power transformer T1 and the source terminal of the synchronous rectifier switch $Q_{SR}$ is coupled to ground. The synchronous rectifier 701 also includes a SR controller 301 and a regulator circuit 303 each of which perform similar functionality as described with respect to FIG. 3. Note that when the SR controller 301 outputs the drive signal 305 to turn on synchronous rectifier switch $Q_{SR}$, the lower side of the secondary winding Ns of the power transformer T1 is coupled to ground thereby completing the circuit of the output stage 203 of the power converter 700 to allow the stored input power to be delivered to the electronic device. When synchronous rectifier switch $Q_{SR}$ is off, the lower side of the secondary winding Ns of the power transformer T1 is floating resulting in an open circuit that prevents the stored input power from being delivered to the electronic device.

In the embodiment shown in FIG. 8, the GND pins of the SR controller 301 and the regulator circuit 303 are coupled to ground. As will be described below, because the ground reference for the SR controller 301 and regulator circuit 303 is ground, the output voltage $V_{OUT}$ may be used to power the SR controller 301. Furthermore, the VCC pin of the SR controller 301 is coupled to both the output voltage $V_{OUT}$ and the output pin of the regulator circuit 303 as will be further described below.

In one embodiment, the synchronous rectifier circuit 701 includes a detector 801. The detector 801 enables or disables the regulator circuit 303 from generating the bias voltage 307 that powers the SR controller 301 during each switching cycle of the power converter 700. In one embodiment, the detector 801 enables or disables the regulator circuit 303 based on the output voltage $V_{OUT}$ of the power converter 700 which is rectified by diode D3. The detector 801 receives the output voltage $V_{OUT}$ and detects whether the output voltage $V_{OUT}$ can be used as the bias voltage to power the SR controller 301 based on the magnitude of the output voltage $V_{OUT}$.

In one embodiment, the detector 801 compares the output voltage $V_{OUT}$ with a reference voltage. The reference voltage may be the minimum bias voltage required to power the SR controller 301. If the output voltage $V_{OUT}$ is less than the reference voltage, the detector 801 transmits a signal EN to enable the regulator circuit 303 to generate the bias voltage 307 that is transmitted to the VCC pin of the SR controller 301. Although the VCC pin of the SR controller 301 is also tied to $V_{OUT}$ via a diode D3, the bias voltage 307 is larger than the output voltage $V_{OUT}$ thereby overriding the output voltage $V_{OUT}$ sensed at the VCC pin of the SR controller 301. The diode D3 is reverse-biased in this condition to avoid current flow from VCC to $V_{OUT}$.

If the output voltage $V_{OUT}$ is greater than the reference voltage, it can be used to power the SR controller 301. When the output voltage $V_{OUT}$ is greater than the reference voltage, in one embodiment the detector 801 transmits a disable signal $\overline{EN}$ to disable the regulator circuit 303 from generating the bias voltage 307. The SR controller 301 uses the output voltage $V_{OUT}$ coupled to the VCC pin to power the SR controller 301. The diode D4 coupled to the VO pin of the regulator circuit 303 and the VCC pin of the SR controller 301 prevents current from flowing to the VO pin of the regulator circuit 303. By disabling the regulator circuit 303 when the output voltage $V_{OUT}$ is sufficient to power the SR controller 301, the conduction loss of the regulator circuit 303 is obviated resulting in higher efficiency of the power converter 700.

Figure 9:
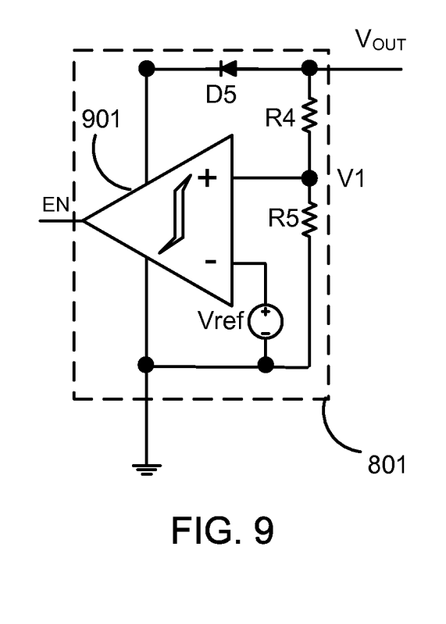
FIG. 9 is a circuit diagram of a detector according to another embodiment.

FIG. 9 is a circuit diagram of the detector 801 according to one embodiment. The detector 801 includes a comparator 901. The comparator 901 is powered by the rectified output voltage output by diode D5. An input of the comparator 901 is coupled to the output voltage $V_{OUT}$ via a resistive voltage divider including resistor R4 and resistor R5. In particular, the input of the comparator 901 is voltage V1 which represents the output voltage $V_{OUT}$. Another input of the comparator 901 is coupled to reference voltage Vref. As mentioned previously, the reference voltage Vref may represent the minimum bias voltage required to power the SR controller 301.

The comparator 901 compares voltage V1 with the reference voltage Vref. If voltage V1 is less than the reference voltage Vref, the detector 801 outputs an enable signal EN to enable the regulator circuit 303 to generate the bias voltage 307 used to power the SR controller 301 since the output voltage $V_{OUT}$ is insufficient for powering the SR controller 301. However, if the voltage V1 is greater than the reference voltage Vref, the detector outputs a disable signal $\overline{EN}$ to disable the regulator circuit 303 since the output voltage $V_{OUT}$ is sufficient to power the SR controller 301. Thus, the SR controller 301 is powered directly from the output voltage $V_{OUT}$ of the power converter 700.

Figure 10:
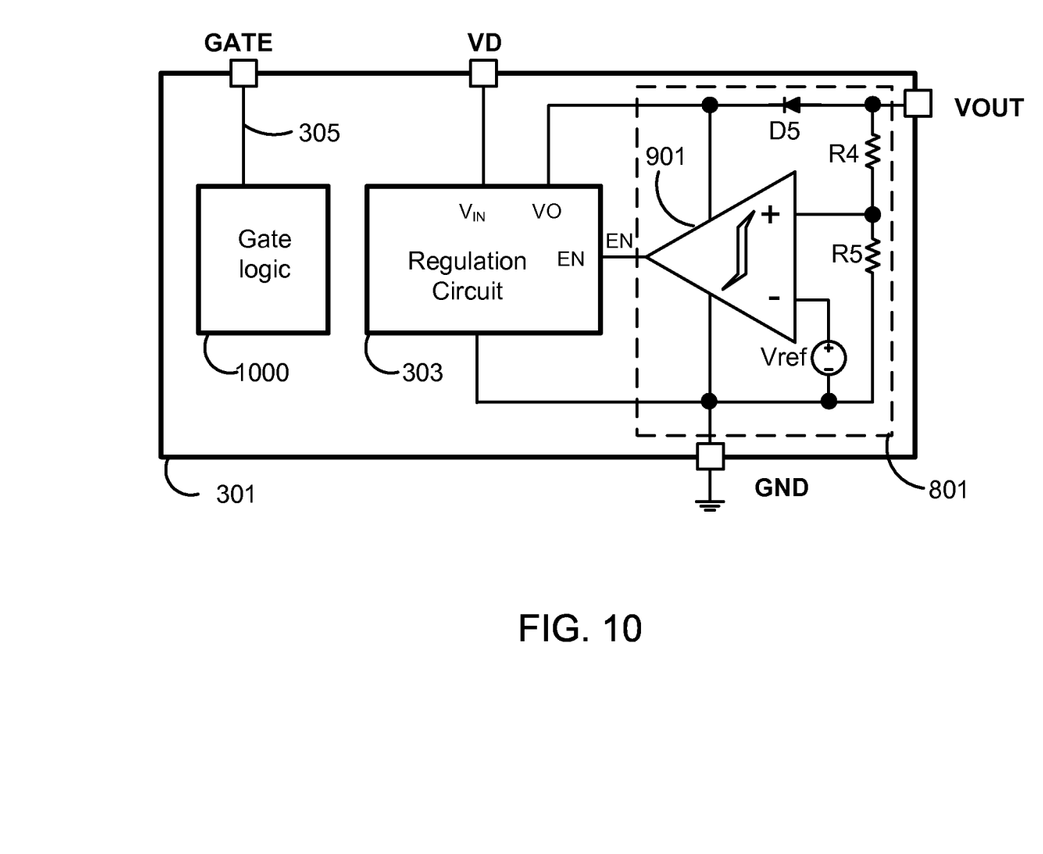
FIG. 10 is a circuit diagram of a synchronous rectifier controller according to another embodiment.

FIG. 10 is a circuit diagram of an alternative embodiment of the SR controller 301 included in the power converter 700. In the embodiment shown in FIG. 10, the detector 801 and the regulation circuit 303 are integrated into the SR controller 301. The detector 801 and regulation circuit 303 perform similar functionality as described with respect to FIGS. 8 and 9. In one embodiment, the SR controller 301 also includes gate logic 1000. The gate logic 1000 outputs the drive signal 305 to the gate terminal of the synchronous rectifier $Q_{SR}$ to turn on the synchronous rectifier $Q_{SR}$ as previously described above.

The regulation circuit 303 receives the drain voltage $V_D$ of synchronous rectifier switch $Q_{SR}$ at the VCC pin of the regulation circuit 303. The regulation circuit 303 also receives as input the output voltage $V_{OUT}$ of the converter 700 at pin VO and an enable signal EN (or disable signal $\overline{EN}$) at pin EN to enable the regulation circuit 303 to generate the bias voltage to power the SR controller 301.

If the detector 801 determines that the output voltage $V_{OUT}$ is less than the reference voltage Vref, the detector 801 outputs the enable signal EN to the EN pin of the regulation circuit 303 as shown in FIG. 10. The enable signal EN enables the regulation circuit 303 to generate the bias voltage to power the SR controller 301. In contrast, if the detector 801 determines that the output voltage $V_{OUT}$ is greater than the reference voltage Vref, the detector outputs the disable signal $\overline{EN}$ to the EN pin of the regulation circuit 303 thereby disabling the regulation circuit 303. The output voltage $V_{OUT}$ can be directly used by the regulation circuit 303 to power the SR controller 301 when the regulation circuit 303 is disabled.

Upon reading this disclosure, those of skill in the art will appreciate still additional alternative designs for powering the SR controller to provide synchronous rectification across the operating range of the CC mode and the CV mode. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

What is claimed is:

1. A switching power converter comprising:
   a transformer including a primary winding coupled to an input voltage and a secondary winding coupled to an output of the switching power converter;
   a switch coupled to the primary winding of the transformer, current through the primary winding being generated while the switch is turned on and not being generated while the switch is turned off;
   a first controller configured to generate a first control signal to turn on or turn off the switch at each switching cycle of the switch;
   a synchronous rectifier switch coupled to the secondary winding of the transformer, power delivered to the output of the switching power converter when the synchronous rectifier switch is turned on and power not delivered to the output of the switching power converter when the synchronous rectifier switch is turned off;
   a second controller coupled to an output voltage of the switching power converter and configured to generate a second control signal to turn on or turn off the synchronous rectifier switch at each switching cycle of the synchronous rectifier switch; and
   a regulator circuit configured to enable the second controller to control the synchronous rectifier switch if the output voltage of the switching power converter is less than a threshold voltage.

2. The switching power converter of claim 1, wherein the regulator circuit is configured to enable the second controller by generating a bias voltage to power the second controller if the output voltage of the switching power converter is less than the threshold voltage.

3. The switching power converter of claim 1, further comprising:
   a detector circuit configured to determine if the output voltage of the switching power converter is less than the threshold voltage or greater than the threshold voltage;
   wherein the detector circuit is further configured to disable the regulator circuit from enabling the second controller if the output voltage of the switching power converter is greater than the threshold voltage; and
   wherein the second controller is enabled using the output voltage of the switching power converter if the regulator circuit is disabled.

4. The switching power converter of claim 1, wherein the secondary winding of the transformer includes a first end and a second end, wherein the synchronous rectifier switch is coupled between the second end and ground.

5. The switching power converter of claim 4, wherein the synchronous rectifier switch couples the second end of the secondary winding to ground when the synchronous rectifier switch is turned on and decouples the second end of the secondary winding from ground when the synchronous rectifier switch is turned off.

6. The switching power converter of claim 1, wherein the regulator circuit is integrated in the second controller.

7. The switching power converter of claim 3, wherein the regulator circuit and the detector are integrated in the second controller.

8. The switching power converter of claim 1, wherein the regulator circuit is a linear regulator circuit or a charge pump circuit.

9. A switching power converter comprising:
   a transformer including a primary winding coupled to an input voltage and a secondary winding coupled to an output of the switching power converter;
   a switch coupled to the primary winding of the transformer, current through the primary winding being generated while the switch is turned on and not being generated while the switch is turned off;
   a first controller configured to generate a first control signal to turn on or turn off the switch at each of a plurality of switching cycles of the switch;
   a synchronous rectifier switch coupled to the secondary winding of the transformer and the output of the switching power converter, power delivered to the output of the switching power converter when the synchronous rectifier switch is turned on and power not delivered to the output of the switching power converter when the synchronous rectifier switch is turned off;
   a second controller configured to generate a second control signal to turn on or turn off the synchronous rectifier switch at each of a plurality of switching cycles of the synchronous rectifier switch; and
   a regulator circuit coupled to the second controller, the regulator circuit configured to enable the second controller to control the synchronous rectifier switch during each of the plurality of switching cycles of the synchronous rectifier switch.

10. The switching power converter of claim 9, wherein the regulator circuit is configured to enable the second controller by generating a bias voltage to power the second controller during each of the plurality of switching cycles of the switch.

11. The switching power converter of claim 9, wherein the secondary winding of the transformer includes a first end and a second end, wherein the second switch is coupled between the first end and the output of the switching power converter.

12. The switching power converter of claim 9, wherein the regulator circuit is integrated in the second controller.

13. The switching power converter of claim 9, wherein the regulator circuit is a linear regulator circuit or a charge pump circuit.

14. In a second controller, a method of controlling a switching power converter, the switching power converter including a transformer including a primary winding coupled to an input voltage and a secondary winding coupled to an output of the switching power converter, a switch coupled to the primary winding of the transformer, current through the primary winding being generated while the switch is turned on and not being generated while the switch is turned off, the switching power converter further including a first controller configured to generate a first control signal to turn on or turn off the switch at each switching cycle of the switch, a synchronous rectifier switch coupled to the secondary winding of the transformer, the switching power converter further including the second controller coupled to an output voltage of the switching power converter, and the switching power converter further including a regulator circuit coupled to the second controller, the method comprising:
- receiving, from the regulator circuit, a signal to enable the second controller to control the synchronous rectifier switch, the signal received if the output voltage of the switching power converter is less than a threshold voltage; and
- generating a second control signal to turn on or turn off the synchronous rectifier switch at each switching cycle of the synchronous rectifier switch, power delivered to the output of the switching power converter when the synchronous rectifier switch is turned on and power not delivered to the output of the switching power converter when the synchronous rectifier switch is turned off.

15. The method of claim 14, further comprising:
generating a bias voltage to power the second controller if the output voltage of the switching power converter is less than the threshold voltage.

16. The method of claim 14, further comprising:
- determining if the output voltage of the switching power converter is less than the threshold voltage or greater than the threshold voltage; and
- disabling the regulator circuit from enabling the second controller if the output voltage of the switching power converter is greater than the threshold voltage;
- wherein the second controller is enabled using the output voltage of the switching power converter if the regulator circuit is disabled.

17. In a second controller, a method of controlling a switching power converter, the switching power converter including a transformer including a primary winding coupled to an input voltage and a secondary winding coupled to an output of the switching power converter, a switch coupled to the primary winding of the transformer, current through the primary winding being generated while the switch is turned on and not being generated while the switch is turned off, the switching power converter further including a first controller configured to generate a first control signal to turn on or turn off the switch at each of a plurality of switching cycles of the switch, a synchronous rectifier switch coupled to the secondary winding of the transformer, the switching power converter further including the second controller, and the switching power converter further including a regulator circuit coupled to the second controller, the method comprising:
- receiving, from the regulator circuit, a signal to enable the second controller to control the synchronous rectifier switch, the signal received during each of the plurality of switching cycles of the synchronous rectifier switch; and
- generating a second control signal to turn on or turn off the synchronous rectifier switch at each of a plurality of switching cycles of the synchronous rectifier switch, power delivered to the output of the switching power converter when the synchronous rectifier switch is turned on and power not delivered to the output of the switching power converter when the synchronous rectifier switch is turned off.

18. The method of claim 17, further comprising:
generating a bias voltage to power the second controller during each of the plurality of switching cycles of the switch.

* * * * *